United States Patent
Armor

[19]

[11] Patent Number: 5,240,674
[45] Date of Patent: Aug. 31, 1993

[54] TWO METHOD FOR CONTROLLING MACROFOULING BY MOLLUSKS BY USING HEAT

[75] Inventor: Anthony F. Armor, Santa Clara, Calif.

[73] Assignee: Electric Power Research Institute, Inc., Palo Alto, Calif.

[21] Appl. No.: 893,732

[22] Filed: Jun. 5, 1992

[51] Int. Cl.⁵ ............................................. B08B 17/00
[52] U.S. Cl. ........................................ 422/6; 43/124; 210/764; 210/774; 422/7; 422/109
[58] Field of Search ............... 210/742, 774; 422/6, 422/7, 38, 109; 43/1, 124; 219/6.5, 10.41, 10.51, 10.57, 10.75, 10.77

[56] References Cited

U.S. PATENT DOCUMENTS

| | | | |
|---|---|---|---|
| 632,919 | 9/1989 | Farley | 422/6 |
| 3,247,054 | 4/1966 | Hodge | 210/764 |
| 3,296,122 | 1/1967 | Karassik et al. | 210/774 |
| 4,561,983 | 12/1985 | Davis et al. | 210/755 |
| 4,814,567 | 3/1989 | De Angelis et al. | 219/10.41 |

FOREIGN PATENT DOCUMENTS

| | | | |
|---|---|---|---|
| 391508 | 10/1990 | European Pat. Off. | 210/764 |
| 2040314 | 8/1980 | United Kingdom | 422/6 |

OTHER PUBLICATIONS

"Chemical Engineers'" Handbook, John H. Perry et al., Fourth Edition, pp. 25-2 and 25-3, copyright 1963.
Published Article in the Baltimore Sun Newspaper of Aug. 6, 1950, "Ship Cleaning by Electricity", Author unknown.

Primary Examiner—Joseph W. Drodge
Attorney, Agent, or Firm—Heller, Ehrman, White & McAuliffe

[57] ABSTRACT

A method and apparatus are provided for preventing the settlement of or for removing attached mollusks and/or their larvae on the surface of a structure exposed to the aquatic habitat of the mollusks. The method comprises heating the surface with heating means, such as induction coils or resistance heaters, to an elevated temperature for a period of time sufficient to kill the mollusks and/or their larvae. The heating means and/or the power source may be movable so that they can be used to heat different components periodically to remove the mollusks or to prevent settlement.

11 Claims, 2 Drawing Sheets

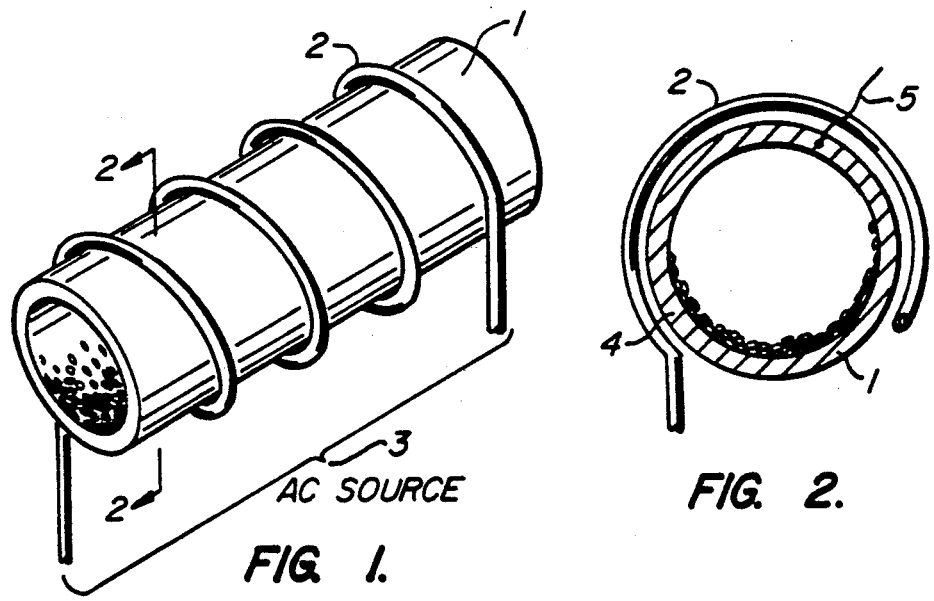
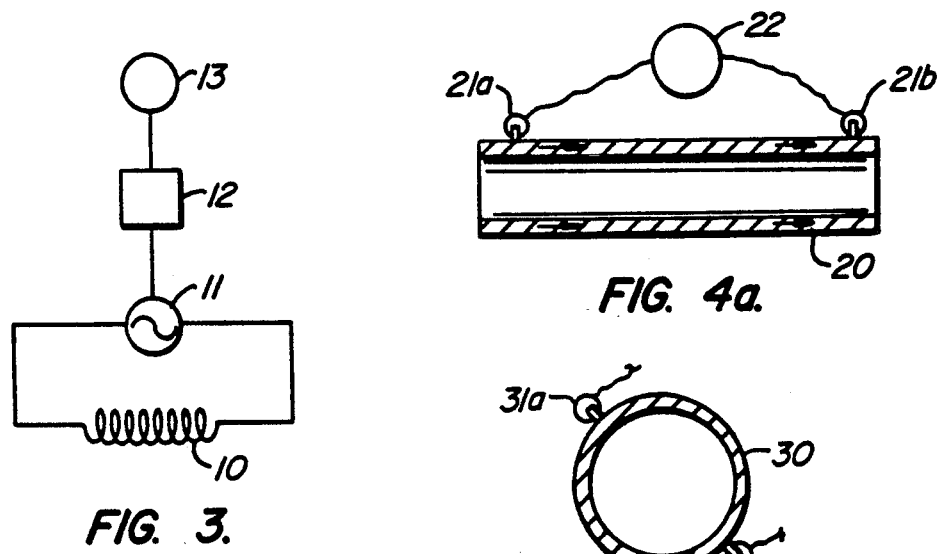
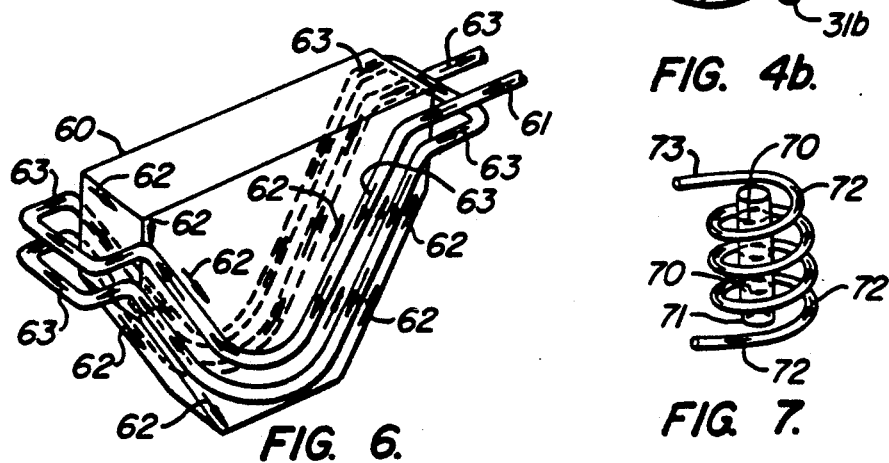

TWO METHOD FOR CONTROLLING MACROFOULING BY MOLLUSKS BY USING HEAT

FIELD OF THE INVENTION

The present invention relates to a method for controlling mollusks and/or their larvae. In particular the present invention is directed to a method for controlling mollusks and/or their larvae to prevent or remove blockage of pipework and other industrial or municipal water system components exposed to their aquatic habitat.

BACKGROUND OF THE INVENTION

There is a need to control the infestation of Zebra mussels, and other mollusks, which attach to inner walls of water flow passages such as pipework and other power plant components which carry water for cooling and other purposes. These mollusks and their larvae thrive in warm, non-turbulent water-flow areas in components such as pipework, and colonies are formed by layers of mollusks which attach to each other. Eventually, if left uncontrolled, the mollusks substantially impede or completely block the flow of water through the pipework or equipment.

A prior art method of dealing with this problem is to use chemical control agents where chemical substances are locally introduced into the water to kill the mollusks and/or their larvae. This, however, raises environmental problems, can be expensive, and there is a problem of localizing the chemical control agent to areas where control is most needed while avoiding areas where the chemical agents may do damage to desirable aquatic flora and fauna.

Another method used is to increase the temperature of the water flowing through the equipment to a temperature at which the mollusks and/or their larvae cannot survive, i.e., for Zebra mussels, greater than about 90° F., preferably greater than 95° F. for maximum effect. However this must be done for a period of a few hours, depending upon the temperature, and can cause power plant output to decrease. Alternatively, one may direct hot water or steam to selected areas for desired killing patterns, however this can be complex and is best suited for large components because of accessibility.

A common characteristic of these mollusk mitigation treatments is that the treatment must be performed from the inside of a pipe or component where the mollusks are accumulated. Therefore, in many cases accessibility limits the utilization of mechanical methods for mollusk abatement. Moreover, the extremely large quantities of water involved in many power plant applications (such as condenser cooling water), makes water treatments, including chemical treatment, exceedingly expensive. In the case of hot water treatments, it is often difficult to reach the requisite temperature. Environmental restrictions on plant effluents may also severely restrict the treatment chemicals and concentrations which may be used, making them less effective.

In commonly assigned U.S. Ser. No. 07/510,109, filed Apr. 16, 1990 now abandoned "Method of Reducing Microbiologically Influenced Corrosion," in the name of Norris Hirota, there is disclosed a method for treating microbiologically induced corrosion of metals in systems of power plants or other facilities which carry liquids which are capable of supporting microbial activity.

It is an object of the present invention to provide a method for removing mollusks and/or their larvae from structures having surfaces exposed to the aquatic habitat of the mollusks and their larvae, without the use of chemical treatments or a large volume of heated water or steam.

It is yet another object of the present invention to provide a method for preventing the growth of mollusks and/or their larvae in equipment whereby the equipment may be periodically purged of growth of mollusks and/or their larvae by localized heating of the pipework, or other equipment to which the mollusks attach.

It is another aspect of the present invention to provide a method for controlling the temperature, frequency of exposure and period of exposure of the mollusks and larvae to the heated equipment according to the present invention.

SUMMARY OF THE INVENTION

The present invention provides a method for prevention of colonization or for removing of existing mollusks and/or their larvae from structures having a surface exposed to the aquatic habitat of such mollusks and larvae, comprising the steps of positioning heating means in heat transfer relationship to the surface exposed to the habitat; and periodically activating the heating means to heat the surface to a predetermined temperature sufficient to kill the mollusks and/or their larvae while not damaging equipment due to excessive temperature.

BRIEF DESCRIPTION OF THE DRAWING

FIG. 1 is a view of a section of pipe, including an induction heating element according to the present invention.

FIG. 2 is a cross-section of the pipe and induction heating element of FIG. 1 taken around the line 2—2.

FIG. 3 is a schematic diagram of an automatic controlling and heating module according to the invention.

FIGS. 4A and 4B are, respectively, cross-sectional side and end views of a pipe adapted to be heated by resistance heating according to the invention.

FIG. 6 is a perspective view of an induction heating element according to the present invention around an irregularly-shaped piece of equipment showing the applied and induced currents.

FIG. 7 is a perspective view of an induction heating element around a pipe showing the applied and induced currents.

DESCRIPTION OF THE PREFERRED EMBODIMENTS

Figure 5:
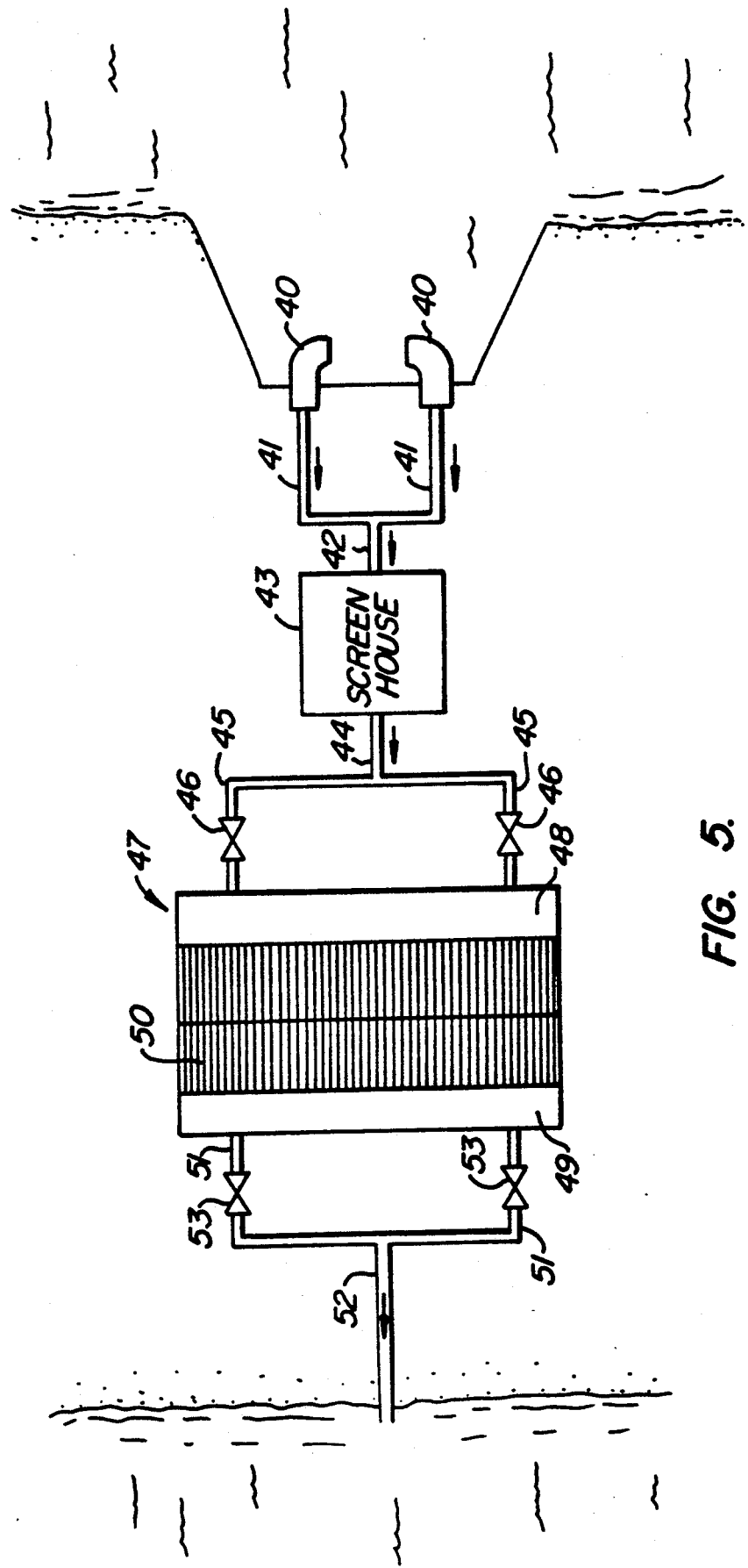
FIG. 5 is a diagram of a typical industrial cooling system using lake or river water, and which indicates the locations of heating modules according to the invention.

The present invention provides a method and apparatus therefor, for preventing and for removing the attachment of mollusks and/or their larvae on surfaces of equipment exposed to their water habitat. According to the present invention the heating means comprises a heating element which (based on magnetic induction or terminal resistance heating) can heat the surface of the structure to a temperature of over about 90° F. in a relatively short time. Typically, this structural component will be a pipe and preferably the heating element will be in the form of an induction coil around the outside of the pipe to effect heat transfer quickly to the inner surface of the pipe, which is in contact with the mollusks and their water habitat. The inner surface and the layer of water immediately adjacent to the inner surface should be heated to a temperature of at least about 90° F. and preferably for instantaneous killing to a temperature of about 100° F. The wall temperature should be maintained for a period of time sufficient to kill the mollusks or larvae attached to the surface of the component. A sufficient period depends on temperature and ranges for Zebra mussels for example from hours (at 90° F.) to minutes (at 100° F.). Control of the maximum temperature is important to avoid equipment damage.

For most applications the heating is preferably accomplished by induction heating whereby the metallic material on the pipe or other surface to be treated is exposed to alternating or varying magnetic flux, and currents are induced to flow in the metallic material. The currents are sometimes referred to as eddy currents and the resultant heat generation within the material as induction heating.

Any shape can be heated by the induction method and the loops of the induction coil determine the direction of lines of magnetic flux and hence the current flows. A sufficient number of loops may be utilized to generate the required amount of heat, depending upon the thickness and length of the material to be heated and its electric and magnetic properties. Alternatively, for very small pipes up to several inches in diameter, terminal resistance heating could be used where electric current is passed directly through the metal to generate heat.

The present method is applicable to any component, duct, pipe, water box, heat exchanger, or tube bundle which is metallic such as the following materials commonly used in power plants: carbon steel, cast iron, stainless steel, copper nickel, aluminum bronze and admiralty brass. The structures include pump housings, metallic pipes within service water systems, condenser water boxes, tube plates and tubes, inlet and discharge water pipes, small heat exchangers, etc., associated with industrial plants or municipal water main systems, all of which are subject to macrofouling by mollusks. The present invention may be applied both to marine and fresh water installations subject to colonization of mollusks such as Zebra mussels, blue mussels, Asiatic clams, etc. The particular advantage of the present method is that it is extremely fast, effective, does not require plant downtime and may be carried out routinely as part of plant maintenance. The heating means, such as induction coils, may be permanently installed at sections of pipe susceptible to accumulation of mollusks, or may be wrapped as needed around the pipe or other component for selective use at particular areas. The present invention is also environmentally benign and will kill both adults and larval forms of the mollusk. Furthermore, heating of the bulk cooling water is not required and it is not necessary to direct hot fluid streams through complicated mechanical systems directed at the mollusks.

FIG. 1 illustrates a section of a waterpipe 1 colonized by mollusks, and wrapped by a number of turns of an electrical conductor 2. The conductor is connected to an AC source 3, such as a motor generator, which supplies a magnetic flux field to the metal pipe 1, which causes eddy currents to flow on the pipe resulting in pipe heating. This causes the inner surface of pipe 1 and the layer of water adjacent to the surface to quickly reach the killing temperature of 90° F. and above.

Referring to FIG. 2 there is shown a cross-section of the pipe 1 given across line 2—2 in FIG. 1. An imbedded thermocouple 5 in the pipe 1 is used to detect the temperature of the pipe. This thermocouple may be electrically connected (not shown) to a power generating unit (not shown) to turn the unit off after the killing temperature has been maintained for a sufficient period of time. For Zebra mussels and for temperatures above 95° F., a period of time of only a few minutes is required and this short period will avoid any damage to equipment which might occur if at high temperature for long periods. The heating unit comprising the power generating source and the induction coils may be then moved to another location on the pipe where there has been a pre-installed thermocouple, and the process may be repeated.

Although a circular pipe is shown in the figures, the geometry is not restricted, and similar set-ups may be utilized for water boxes, heat exchangers, pump housings, etc. The induced eddy currents run parallel to the applied currents of the induction coils which need to be draped appropriate to the component geometry for the best heating.

Referring to FIG. 3, there is shown a diagram of an automatic controlling and heating module for heating a section of pipe or other equipment according to the present invention. The induction coils 10 surrounding the pipe or equipment (not shown) will be powered by an AC power source 11. The power source will be controlled by a control unit 12 comprising a thermostat and timer which may be set to turn on the power source at a designated power level at pre-set times. A thermocouple 13 will be connected to the control unit 12 and will be typically embedded in the pipe or equipment, as shown by 5 in FIG. 2. The thermocouple 13 is utilized to maintain the pipe or equipment at the appropriate temperature for the requisite period of time.

Referring to FIG. 4A there is shown a cross-sectional side view of a pipe 20 adapted with longitudinally displaced terminals, 21A and 21B, electrically attached to a power source 22. This configuration is particularly preferred for heating sections of a short section of a small diameter pipe up to several inches in diameter. Referring to FIG. 4B there is shown a cross-section of pipe 30 showing terminals 31A and 31B disposed circumferentially on the pipe so as to effect more uniform heating of the pipe.

Referring to FIG. 5 there is shown a diagram of a typical industrial cooling system using lake or river water. The system comprises intake pumps 40 for withdrawing water from the lake or river, which is then directed through conduits 41 and 42 to a screen house 43 for screening residue from the water. From the screen house the cool water is conducted via conduits 44 and 45 through valves 46 into the condenser 47 which comprises water box compartments 48 and 49 and condenser tubes 50. The hot water is directed through conduits 51 and 52 via valves 53 into a lake or river. Typical locations for utilizing heaters according to the present invention are on the pump housings 40, conduits 41, 42, 44 and 45, screen house 43, valves 46 and the water boxes 48 on the cool end of condenser 47.

Referring to FIG. 6 there is shown a perspective view of an induction heating element according to the present invention around an irregularly shaped piece of equipment such as a water box or pump housing. The water box or pump housing 60 is surrounded by two loops of induction coil 61 carrying applied currents. With the induction heater on, eddy currents as indicated by arrows 62 are induced to heat 60. The applied current through coil 61 is indicated by arrows 63.

Referring to FIG. 7, typical induced currents (arrows 70) in a circular pipe 71 are shown. Currents flow (arrows 72) in the induction coil 73 result in a magnetic flux pattern around the coil. In turn this induces eddy currents to flow in the pipe 71, resulting in heating of the pipe.

In a typical situation, for macrofouling removal, the equipment involved is made of steel of an inch or less in thickness. For an induction heating system, the amount of power dissipated as heat in the surface of a component, in terms of the magnetic flux density, the frequency, and the electrical characteristics of the metal being heated is:

$$P = H^2 SL \sqrt{\mu f \rho_a} \, (.00316) \text{ watts}$$

wherein H = the field (oersteds); S is the shape factor, L is the length (in centimeters) $\mu$ = permeability; f = frequency (Hz), $\rho_a$ = resistivity of the material (ohm$-$cm$^3$) and the field H is given by $$H = \frac{4\pi N i \sqrt{2}}{10L}$$

where
N = number of turns
i = applied current in amps

For steel pipes of a few feet in length, a suitable 480 HZ induction heating system can be shown with these equations to reach a temperature of 100° F. in a matter of minutes.

In a preferred embodiment, each pipe, tube, heat exchanger, water box, etc. subject to exposure to the aquatic habitat of the mussels may be equipped with induction coils and thermocouples. Periodically these may be connected to the heat source and heated long enough to obtain a temperature of typically from 90°–100° F. for the requisite period.

The following example is presented by way of illustration and is not intended to limit the invention in any way.

EXAMPLE

The instant mortality of Zebra mussels occurs when they are exposed to the temperatures indicated below for the specified times:

| TEMP, °F. | TIME (mins) |
|---|---|
| 93 | 30 |
| 94 | 20 |
| 95 | 15 |
| 96 | 10 |
| 100 | 1 |

Accordingly, induction heating coils are placed around pipes, monitored with thermocouples, and the pipes are heated for a selected period of time sufficient to heat the water in the pipes to a temperature and for a period of time sufficient to kill Zebra mussels within the pipe.

What is claimed is:

1. A method for prevention of settling or for removal of growth of mollusks and/or their larvae from a structure having a metallic wall, the interior surface of which is exposed to the aquatic habitat of said mollusks, comprising the steps of
    a. positioning heating means outside of said wall in heat transfer relationship across said wall to said interior surface;
    b. periodically activating said heating means to heat said interior surface to a selected temperature sufficient to kill said mollusks and/or their larvae in contact with said interior surface.

2. The method according to claim 1 wherein said predetermined temperature is above 90° F.

3. A method according to claim 2 wherein said mollusks comprise Zebra mussels.

4. A method according to claim 1 wherein said heating means comprises induction coils.

5. A method according to claim 1 wherein said heating means comprises direct resistance heating through electrical terminals on the outside of said wall.

6. A method for preventing growth of mollusks and/or their larvae on the interior surface of a wall of a structure exposed to the habitat of said mollusks comprising the steps of
    a. positioning heating means outside of said wall in heat transfer relationship across said wall to said interior surface;
    b. coupling said heating means to a controlling means;
    c. activating said controlling means to periodically activate said heating means to increase the temperature of said interior surface to a selected temperature selected to kill said mollusks and/or their larvae.

7. A method according to claim 6 wherein said predetermined temperature is above 90° F.

8. A method according to claim 7 wherein said mollusks comprise Zebra mussels.

9. A method according to claim 6 wherein said controlling means comprises a temperature sensor and thermostat control.

10. A method according to claim 6 wherein said heating means and controlling means are permanently affixed to said wall.

11. A method according to claim 6 wherein said heating means and controlling means are mobile and can be repositioned.

* * * * *

UNITED STATES PATENT AND TRADEMARK OFFICE
CERTIFICATE OF CORRECTION

PATENT NO. : 5,240,674
DATED : August 31, 1993
INVENTOR(S) : Anthony F. Armor

It is certified that error appears in the above-indentified patent and that said Letters Patent is hereby corrected as shown below:

On the Title Page Item [54], please delete "METHOD" and insert "METHODS".

Signed and Sealed this

Twenty-seventh Day of September, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,240,674
DATED : August 31, 1993
INVENTOR(S) : Anthony F. Armor

It is certified that error appears in the above-indentified patent and that said Letters Patent is hereby corrected as shown below:

On the Title Page, Item [54] should read as:
--METHOD FOR CONTROLLING MACROFOULING BY MOLLUSKS BY USING HEAT--.

This certificate supersedes Certificate of Correction issued September 27, 1994.

Signed and Sealed this

Sixth Day of December, 1994

Attest:

BRUCE LEHMAN

*Attesting Officer*  *Commissioner of Patents and Trademarks*